US011393150B2

United States Patent
Choi et al.

(10) Patent No.: US 11,393,150 B2
(45) Date of Patent: *Jul. 19, 2022

(54) GENERATING AN ANIMATION RIG FOR USE IN ANIMATING A COMPUTER-GENERATED CHARACTER BASED ON FACIAL SCANS OF AN ACTOR AND A MUSCLE MODEL

(71) Applicant: Unity Technologies SF, San Francisco, CA (US)

(72) Inventors: Byung Kuk Choi, Wellington (NZ); Gergely Klár, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/153,569

(22) Filed: Jan. 20, 2021

(65) Prior Publication Data

US 2022/0005249 A1    Jan. 6, 2022

Related U.S. Application Data

(63) Continuation of application No. 17/035,550, filed on Sep. 28, 2020.

(60) Provisional application No. 63/047,847, filed on Jul. 2, 2020.

(51) Int. Cl.
| | |
|---|---|
| *G06T 13/40* | (2011.01) |
| *G06T 17/20* | (2006.01) |
| *G06V 40/16* | (2022.01) |

(52) U.S. Cl.
CPC ............. *G06T 13/40* (2013.01); *G06T 17/20* (2013.01); *G06V 40/166* (2022.01)

(58) Field of Classification Search
None
See application file for complete search history.

(56) References Cited

U.S. PATENT DOCUMENTS

| | | | |
|---|---|---|---|
| 2006/0071934 A1* | 4/2006 | Sagar ................... | A61B 5/1126 345/473 |
| 2009/0195545 A1* | 8/2009 | Debevec ................ | G06T 13/40 345/473 |
| 2010/0045680 A1* | 2/2010 | Havaldar ............... | G06T 13/40 345/473 |
| 2014/0085293 A1* | 3/2014 | Konoplev .............. | G06T 13/40 345/419 |
| 2015/0213307 A1* | 7/2015 | Beeler .................. | G06V 40/174 382/190 |
| 2018/0130245 A1* | 5/2018 | Kozlov .................. | G06T 13/40 |
| 2019/0325633 A1* | 10/2019 | Miller, IV ............ | G06V 40/172 |
| 2021/0012549 A1* | 1/2021 | Comer ................... | G06F 1/163 |
| 2022/0005248 A1 | 1/2022 | Choi et al. | |

OTHER PUBLICATIONS

Li et al. "Example-Based Facial Rigging", (Year: 2010).*

(Continued)

*Primary Examiner* — Hilina K Demeter

(74) *Attorney, Agent, or Firm* — Philip H. Albert; Jiaping Liu; Haynes and Boone LLP

(57) ABSTRACT

An animation system wherein scanned facial expressions are processed to form muscle models that can be used to generate expressions based on specification of a strain vector and a control vector of the muscle model.

20 Claims, 6 Drawing Sheets

(56) References Cited

OTHER PUBLICATIONS

Tang et al., "A NURBS-based Vector Muscle Model for Generating Human Facial Expressions", 2003 (Year: 2003).*
Cheol Lee et al., "3D Face Deformation Using Control Points and Vector Muscles", 2007 (Year: 2007).*
Tang et al., "A NURBS-based Vector Muscle Model for Generating Human Facial Expressions" (Year: 2006).*
Barrielle et al., "BlendForces: A Dynamic Framework for Facial Animation" (Year: 2016).*
Alexander et al., "Creating A Photoreal Digital Actor: The Digital Emily Project", 2009, 12 pages.
Ichim et al., "Phace: Physics-based Face Modeling and Animation", ACM Transactions on Graphics, ACM, NY, US, vol. 36, No. 4, Jul. 20, 2017, 14 pages.
Sifakis et al., "Automatic Determination of Facial Muscle Activations from Sparse Motion Capture Marker Data", Jul. 1, 2005, 9 pages.
Waters, "A Muscle Model for Animating Three-Dimensional Facial Expression" Computer Graphics Proceedings, Annual Conference Series Siggraph, vol. 21, No. 4, Jul. 1, 1987, 8 pages.
International Search Report and Written Opinion in Internation Application No. PCT/NZ2020/050119 dated Jun. 4, 2021, 14 pages.

\* cited by examiner

Muscle Model

| Muscle # | Bone Attachment Point for Muscle | Skin Attachment Point for Muscle | Muscle Volume (in cubic mm) |
|---|---|---|---|
| $M_1$ | $(x_1, y_1, z_1)$ | $(u_1, v_1)$ | $V_1$ |
| $M_2$ | $(x_2, y_2, z_2)$ | $(u_2, v_2)$ | $V_2$ |
| $M_3$ | $(x_3, y_3, z_3)$ | $(u_3, v_3)$ | $V_3$ |
| ... | ... | ... | ... |
| ... | ... | ... | ... |
| $M_N$ | $(x_N, y_N, z_N)$ | $(u_N, v_N)$ | $V_N$ |

| Joints | Description | Type of Value |
|---|---|---|
| J | Jaw | Angle |
| E.l | Left Eye | Rotation in 2D |
| E.r | Right Eye | Rotation in 2D |
| ... | ... | ... |

FIG. 3

GENERATING AN ANIMATION RIG FOR USE IN ANIMATING A COMPUTER-GENERATED CHARACTER BASED ON FACIAL SCANS OF AN ACTOR AND A MUSCLE MODEL

CROSS-REFERENCES TO PRIORITY AND RELATED APPLICATIONS

This application is a continuation of U.S. Nonprovisional application Ser. No. 17/035,550, filed Sep. 28, 2020, which in turn claims the benefit of U.S. Provisional Patent Application No. 62/047,847, filed Jul. 2, 2020 entitled "Generating an Animation Rig for Use in Animating a Computer-Generated Character Based on Facial Scans of an Actor and a Muscle Model".

The entire disclosures of applications recited above are hereby incorporated by reference, as if set forth in full in this document, for all purposes.

FIELD OF THE INVENTION

The present disclosure generally relates to tools for generating computer-generated imagery. The disclosure relates more particularly to apparatus and techniques for generating animation rigs used by animators in creating computer-generated imagery.

BACKGROUND

Many industries generate or use computer-generated imagery, such as images or video sequences. The computer-generated imagery might include computer-animated characters that are based on live actors. For example, a feature film creator might want to generate a computer-animated character having facial expressions, movements, behaviors, etc. of a live actor, human or otherwise. It might be possible to have an animator specify, in detail, a surface of the live actor's body, but that can be difficult when dealing with facial expressions and movements of the live actor, as there are many variables.

One approach is to capture scans of different facial expressions of an actor and blend captured expressions in varying degrees to create facial expressions other than the exact ones captured. However, this can be a tedious operation. An improved animation system might provide an animator with tools to more easily create desired expressions.

SUMMARY

In an embodiment, a computer-implemented method or apparatus provides for generating a facial expression in an animation system, comprising receiving data associated with a plurality of facial scans of a face of an actor over a plurality of facial expression poses, training a system to match the plurality of facial scans to a muscle model that could, at least approximately, express some of the plurality of facial expression poses, extracting from the facial expression poses, a representation of physical deformations of a facial surface of the face, determining, from the representation of physical deformations of the facial surface and the muscle model, a strain vector representing strains of a set of facial muscles of the muscle model, generating a mesh representing the facial surface of the face that is formed into expressions based on the muscle model and strain vector values and their corresponding deformations, and determining values for the set of vector values in the strain vector that adjust the mesh to form an animated facial expression that corresponds to a plausible facial expression from the actor.

The plurality of facial scans might comprise data pertaining to the physical surface deformations, wherein the deformations are associated with the facial expression poses. The actor might be a human being.

Determining the control vectors might comprise determining strain values associated with expansion and contraction of muscles of the set of facial muscles.

An animated image might comprise generating a facial expression of any preceding clause and generating an animated image using the facial expression.

An animation system might comprise at least one processor and medium storing instructions, which when executed by the at least one processor, cause the animation system to implement these methods.

BRIEF DESCRIPTION OF THE DRAWINGS

Various embodiments in accordance with the present disclosure will be described with reference to the drawings, in which:

FIG. 3 illustrates an example of a data structure that might represent a muscle model, in an embodiment.

DETAILED DESCRIPTION

Figure 1:
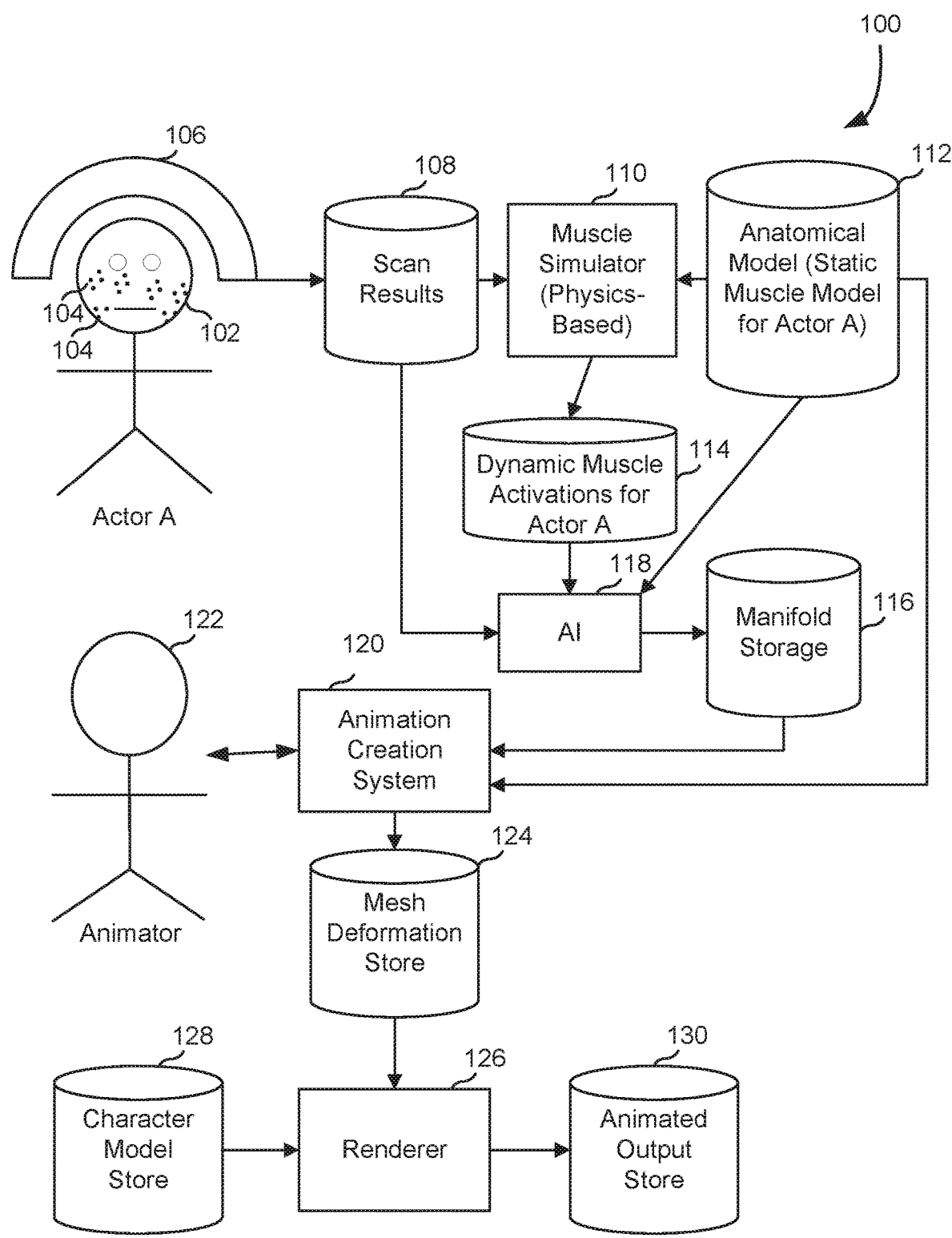
FIG. 1 illustrates an animation pipeline that might be used to render animated content showing animation of a character based on a model and a rig that is generated from scans of an actor, in an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

An animator might be a human artist, filmmaker, photography image creator, or the like, who seeks to generate one or more images (such as a video sequence forming an animation) based on animator input and other data available to the animator. In some embodiments, the animator might be an automated or partially automated process. Animator inputs might include specifications of values for positions of movable elements. For example, an articulated character's movement might be specified by values of each available joint in the character. A rig might be a representation of data that corresponds to elements of a character, the allowed movements, etc.

One such rig is a facial rig. An animator might be provided with a user interface of an animation creation system that allows the animator to input values for various movable elements of the facial rig. Some movable elements might be a jaw and a collection of muscles. From a specification of provided variables of the movable elements of the facial rig, the animation creation system can generate a pose of the facial rig. For example, when variables corresponding to an amount of contraction for the muscles on either side of the mouth are set to values that represent maximum contraction of those muscles, the animation creation system would output a pose with a face having a widened mouth. By varying the variables from frame to frame, and thus changing poses from frame to frame, animation creation system can output positions of elements, thicknesses of elements, etc., which might be provided as input to a rendering system.

Thus, an animator can generate animation of a face of a character making an expression, perhaps talking according to certain speech, and moving around by inputting, or otherwise specifying or determining, a set of strains, wherein a strain is a metric of a muscle that can be moved. In an example, a strain of a muscle is represented as a numerical value where 0.0 corresponds to the muscle in a rest or default position, a positive number corresponds to muscle contraction and a negative number corresponds to muscle relaxation. For example, the numerical value for a strain, S, of a muscle, M, might be as expressed in Equation 1.

$$S_M = (\text{rest\_length}_M - \text{length}_M) / \text{rest\_length}_M \quad \text{(Eqn. 1)}.$$

A difficulty with animating a face is that there are a large number of facial muscles and specifying a strain for each can be tedious, especially where many scenes need to be created. Another difficulty is in creating a model for the facial rig, specifying where each muscle attaches to a skull and to skin, or some other facial feature. For an animated face to look right, it is often necessary that the strains correspond to actual strains in live actor muscles, but it is not practical to determine, even for one live actor, where each muscle connects on that actor's skull and skin, the thicknesses of the muscles, subdermal structures, etc. and thus the building of a model and a facial rig that correspond to a particular live actor.

In an embodiment described herein, expressions of an actor are determined for example, by scanning the actor's face to capture scanned data, which can identify how points on the surface of the actor's face move in three dimensions. A number of expressions can be scanned. While it is generally known which muscles are present in a face of a well-studies species, such as humans, there can be variability in where the muscles are attached, which are activated, where both ends are attached, their thicknesses, and what range of strains are possible. For example, a person with a "jowly" face would have different values for those than a person with a non-jowly face. As another example, there are some actors who are able to strain muscles (i.e., move them away from their rest positions) to cause their ears to wiggle and there are others who cannot strain those muscles. In some cases, the scanning or expression determination might be done on actors who are no longer living, perhaps from 2D or 3D recordings of the actor when alive.

An animation creation system and animators who use the animation creation system might want a model for a specific live actor, including their skull shape, muscle-to-skull attachment positions, muscle thicknesses, etc., to construct a facial rig that can be animated, but that might not be possible to determine directly from the live actor. One solution is to only rely on scanned expressions and the animator is permitted to create other expressions not directly scanned by specifying a linear combination of the available scans, but that is often constraining. The shape blending system might be treated as a rig that the animator can control by specifying blend shape weights, but for faces, this can be hard. Some results might be less than desirable as a human can create an almost infinite number of facial expressions and not all of those can be captured for blending.

In some embodiments, an AI system can generate a trained manifold based on inputs from the scan results, dynamic muscle activations, and an anatomical model. A physics-based muscle simulator might be used to generate dynamic muscle activations that are then consumed by the AI to produce a trained manifold.

FIG. 1 illustrates an animation pipeline 100 that might be used to render animated content showing animation of a character based on a model and a rig that is generated from scans of a live actor. As illustrated there, a live actor 102 ("Actor A") might be outfitted with fiducials 104 and have their face, expressions and/or body scanned by a scanner 106. The scanner 106 would then output or store results of scanning to a scan results store 108. The fiducials 104 allow for the scan data that results from scanning to include indications of how specific points on the surface of the face of the live actor 102 move given particular expressions. If the scanner 106 captures data in three dimensions ("3D"), the scan data could also indicate the surface manifold in 3D space that corresponds to the surface of the live actor's face. While it might be expected that the skull of the live actor 102 is a constant shape and changes only by translations and rotations (and jaw movement), it is not expected that the surface manifold would be constant, a jaw movements, air pressure in the mouth, muscle movements, and other movable parts move and interact. Instead, different movements and facial expressions result in different thicknesses, wrinkles, etc. of the actor's face.

It might be assumed that each human actor has more or less the same facial muscles. An anatomical model dataset 112 might be provided that represents muscles, where they connect, what other typical facial elements are present (eyes, eyelids, nose, lips, philtrum, etc.) and other features likely common to most human faces. Of course, not all human faces are identical, and the actual positions of muscles, their thicknesses, where they connect to, how much they can relax and contract, are details that can vary from person to person, as well as the shape of their skull. It is typically not practical to directly determine these details from a specific live actor, as that might require invasive procedures or complex computerized axial tomography (CAT) or Magnetic resonance imaging (MRI) scans. The anatomical model 112 can represent a muscle model for Actor A. This anatomical model 112 can be provided to a muscle simulator 110 that performs physics-based muscle simulation and provides a dynamic muscle activations dataset 114 for Actor A. The anatomical model can also be provided to an Artificial Intelligence (AI) system 118 obtains the scan results from scan results store 108, and infers—perhaps by iterative training—the shape of the live actor's skull, volume of muscles, etc., to build a manifold of possible movements for the actor that is stored in dynamic muscle activations dataset 114, which might store different models for different actors. In some implementation, the AI system 118 may further derive the range of motion of a muscle or a joint, and incorporate the range of motion into generating the manifold. The AI system 118 might output a manifold to be stored in manifold storage 116.

The manifold might represent the range of plausible expressions. Logically, the manifold might represent a set of solutions or constraints in a high-dimension space corresponding to a strain vector.

Using an animation creation system 120, an animator 112 could generate meshes that correspond to facial expressions of the live actor for whom the muscle model was derived. A mesh might be stored in a mesh deformation store 124. If mesh corresponded to the facial surface of Actor A, the animation creation system 120 could be used by the animator 122 to generate a facial surface of an expression that was not specifically made by Actor A, but would be near what it would be if Actor A had tried that expression. The animation creation system 120 might constrain an animator's inputs by projecting them onto the manifold, which would have an effect of transforming animator inputs that are not corresponding to a plausible expression into a strain vector that does correspond to a plausible expression. The animator's inputs might be represented in memory as a strain vector, having components corresponding to some facial muscles, as well as other animation variables that might not be related to muscles or that are more easily represented directly, such as jaw movement, eye movement, and the like. A strain vector might be represented by an array of values, wherein a value in the array corresponds to a vector component that is a value of strain in a particular dimension, representing strain on one muscle perhaps.

A renderer 126 can process the facial surface, perhaps mapping it to a character model from a character model store 128, such as a non-human character played by Actor A, to form animated output that might be stored in animated output store 130.

Figure 2:
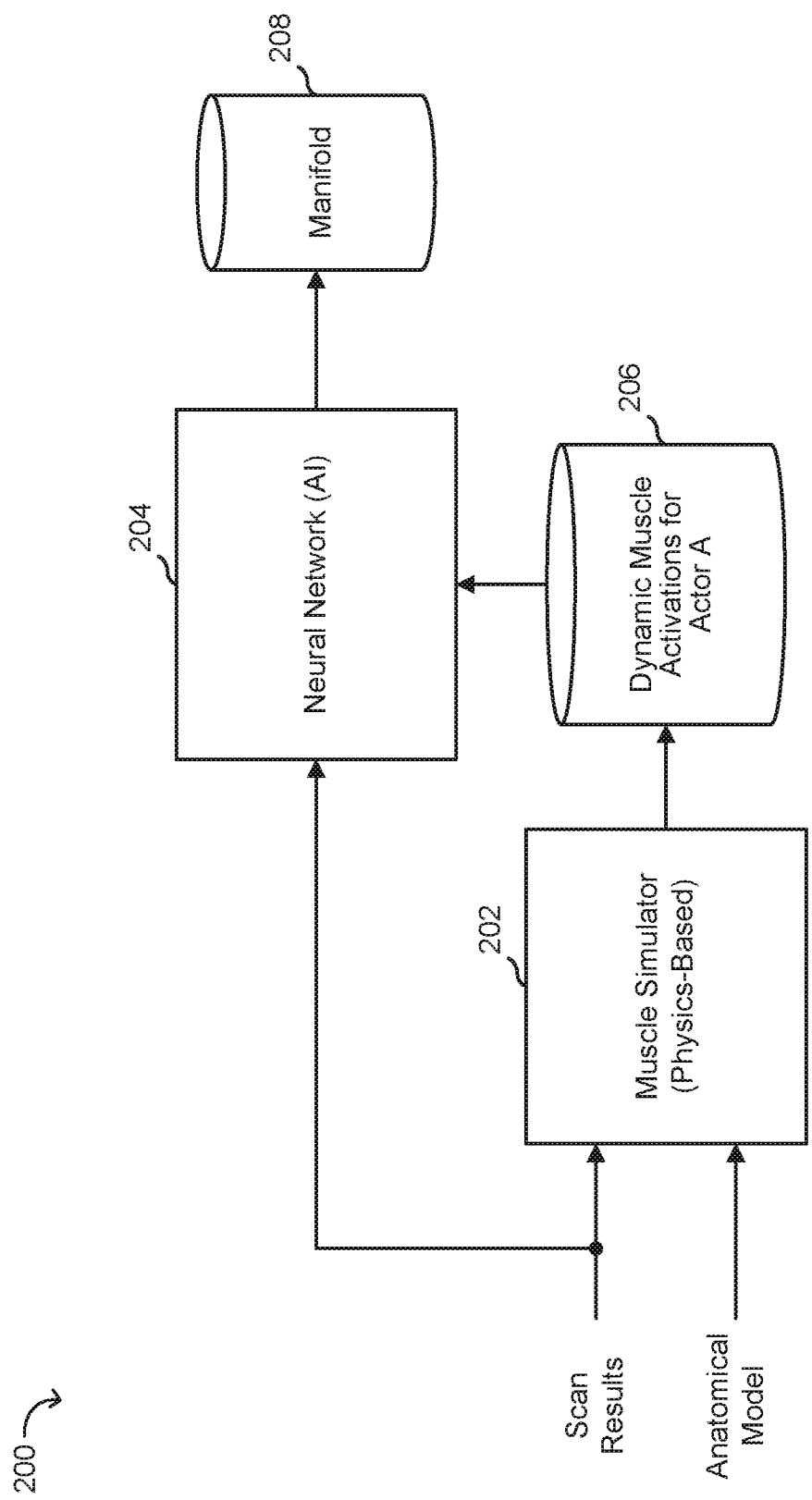
FIG. 2 illustrates an example neural network, in an embodiment.

FIG. 2 illustrates an example neural network system 200 in which scan results are provided to a muscle simulator 202 and a neural network 204 and an anatomical model to the muscle simulator 202. An output of the muscle simulator 202 is dynamic muscle activations for Actor A, which in turn are provided to neural network 204. Neural network 204 then outputs a manifold to manifold storage 208.

FIG. 3 illustrates an example of a data structure that might represent a muscle model. In that model, each muscle might be defined by a bone attachment point, a skin attachment point, and a muscle volume. In animation, as the strain on a muscle changes, the volume of the muscle might change shape, and the distance between the bone attachment point and the skin attachment point might change, thus creating expressions. Additional elements might be included in a control vector that are for other animation variables.

Figure 4:
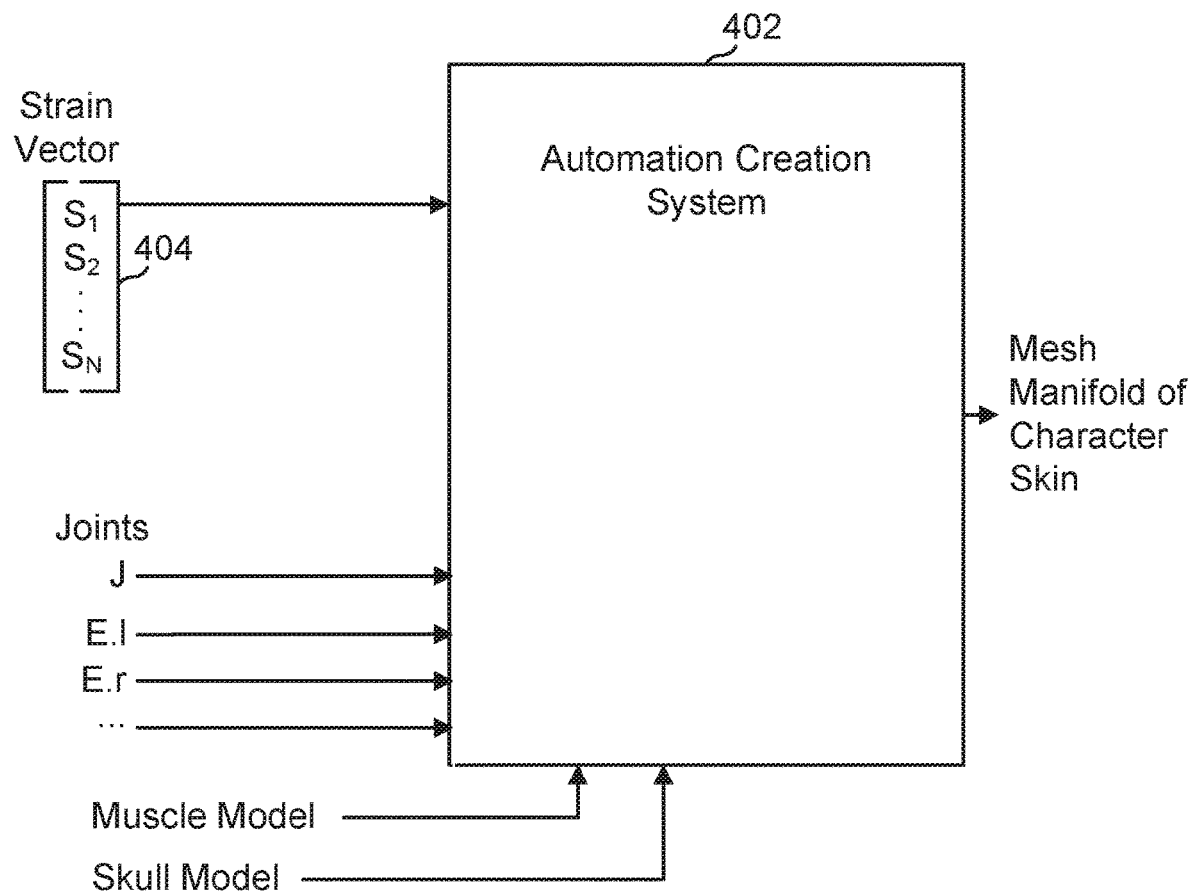
FIG. 4 illustrates inputs and outputs of an animation creation system, in an embodiment.

FIG. 4 illustrates inputs and outputs of an animation creation system 402. Inputs might include an input strain vector 404, indicative a strain values for some or all of the muscles in the muscle model, and values for the other animation variables, such as a scalar value for a jaw angle, two 2D vectors corresponding to rotations of the eyes, etc. Along with the muscle model, which describes where the muscles are attached and their volume, and a skull model representing an actor's skull shape and contour, and a control vector for other non-muscle animation variables, the animation creation system 402 can determine the volumes occupied by the muscles, and thus the surface of the character's skin, and output a mesh manifold of the character's skin, possibly depicting an expression corresponding to the input strain vector 404.

Using the above methods and apparatus, an animator can specify a facial expression in the domain of muscle semantics, which can simplify an animation process compared to limiting the animator to making combinations of recorded expressions as blends of the scanned facial shapes. In the general case, a length of a muscle is determined from its strain value and its rest length. Allowed strain values might be constrained by the manifold so that strain values remain within plausible boundaries. For a given scan of an expression on an actor's face, a muscle model for that live actor, and a skull model for that live actor, an AI process can determine a likely strain vector that, when input to an animation generation system, would result in an expression largely matching the scanned expression. Knowing the strain values, the animation generation system can provide those as the domain in which the animator would modify expressions. After training an AI system using dynamic scans of an actor's face as the ground truth for training, the muscle model can be derived that would allow for the simulation of other expressions that were not captured.

In some instances, there might be more than one hundred muscles represented in the muscle model and the AI system that extracts a strain vector and a control vector from dynamic scans of the actor might be able to provide approximate solutions to match expressions. The control vector might include other values besides jaw and eye positions.

As explained herein, an animation process might simulate facial expressions through the use of a unique combination of hi-resolution scans of a human face, simulated muscles, facial control vectors, and constraints to generate unlimited facial expressions. In one embodiment, an AI system is employed to receive facial control vectors generated from a series of muscle strain inputs and process those vectors relative to a facial expression manifold configured to constrain facial expressions of the simulation to plausible expressions. Simulation need not be limited to simulating facial expressions that correspond to a real-world physical action, but more generally might be the generation of facial expressions informed by expressions made and recorded.

Separate AI systems might be used to train and derive the muscle model and to train and derive the manifold. In some embodiments, in order to hit a target expression (and corresponding skin shape), the muscle model might be differentiable. An AI system might include a variational autoencoder (VAE).

The AI uses muscle control vectors, instead of blend shape weights or other approaches, and can then specify strains on those muscle control vectors, which would in turn specify lengths of contractions of the muscles in a simulator. Each muscle scan be represented by a curve, which might have a length that is a function of the strain. A muscle vector might comprise strains that affect a mesh representing the skin of a character. The muscles might include a rest length and attachment point, and together represent a muscle geometry. Using the combination of the input scans, the strains, the muscle control vectors, and manifold constraints, an animation system can output plausible facial expressions.

As explained herein, an animation system might be driven to create animations of a character's face based on movements of a real-world actor's face. A scanner would capture expressions from the actor, thus obtaining a set of dynamic scans. From those dynamic scans, a muscle simulator could compute strain vectors to go with a dynamic scan, wherein the strain vector would indicate the set of strains and jaw position, and perhaps other non-muscle parts positions, that match or are deemed to match the results of the dynamic scan. For example, the real-world actor might be posing in a "surprise" pose, indicative of being surprised. Once input to the muscle simulator, possibly also with anatomical specifics of that actor and a generic anatomical model of the human face, the muscle simulator could output a strain vector wherein components of the strain vector correspond to muscle strains.

In a very specific example, a surprise pose can include raised eyebrows and the muscle simulator might output a strain vector in which strain vector components corresponding to muscles above the eyebrows have strain values that represent contractions of those muscles. Having a set of strain vectors for various expressions, an animator can operate in the strain vector space rather than being limited to blending in the expression space. From the set of strain vectors, an animation processor can compute a manifold of plausible values for a strain vector. An animation editing system can use that manifold to constrain artist inputs when an artist is trying to create a new expression that was not scanned or was not posed by the actor. In this manner, the artist can be assured that what they create will be a plausible expression. Also, rather than having to manipulate a scan of an expression, the artist can edit a strain vector for a desired expression and then an animation system can compute a 3D mesh of a facial rig that would result from application of the strains and positions dictated by the strain vector the artist edited. Since the artist can edit in the strain vector space, they can create strain vectors for expressions not otherwise available. In some cases, operating in the strain vector space with muscle semantics is easier than operating in an expression blend space blends and semantics of captured expressions.

With a suitable facial rig, which might be specific to a specific actor, an animation system can compute a 3D mesh from a strain vector. In some cases, the 3D mesh results in what looks like the original actor, but in other cases, the facial rig represents a fanciful character. For example, a facial rig might use an anatomy created by another artist that does not fully match the actor's anatomy and/or proportions.

In some editing systems, the artist might be provided an interface for blending strain vectors and an editing system might be configured such that strain vectors of actual expressions constitute boundaries of what the artist can create. In this way, a manifold might be formed. Effectively, this might provide the artist with a mechanism for creating a new expression by blending, weighted or otherwise, strain vectors and operating a facial rig according to the resulting blended strain vector rather than having to blend scanned expressions.

An AI system can be used with feedback to refine an expression to strain vector mapping process. For example, an AI system might take in a scanned expression, generate a strain vector, animate the facial rig using the strain vector to generate an output expression, then compare the output expression to the scanned expression and use differences of those as a loss function for training the AI system. With this feedback, the AI system can be trained to quickly generate strain vectors for a previously unseen expression. In some embodiments, the AI system uses a VAE for training.

An animation system can generate a mesh representing a surface of a character or actor having an expression that is determined by applying the strain vector to the facial model. The facial model might model muscles as constant volume objects that connect two places on the face and can relax and contract. The facial model might include a skin surface wherein some of the muscles in the facial rig are attached to positions below the skin. Thus, a muscle, its volume, its rest length, and its attachment point(s) together can represent muscle geometry properties.

In some embodiments, strain vector values are differentiable and the animation system that is determining a strain vector to match a particular expression can make adjustments of strain vector values to match the particular expression. Using a combination of high-resolution input scans, strains values, muscle control vectors, and manifold constraints, plausible facial expressions are easily simulated.

Figure 5:
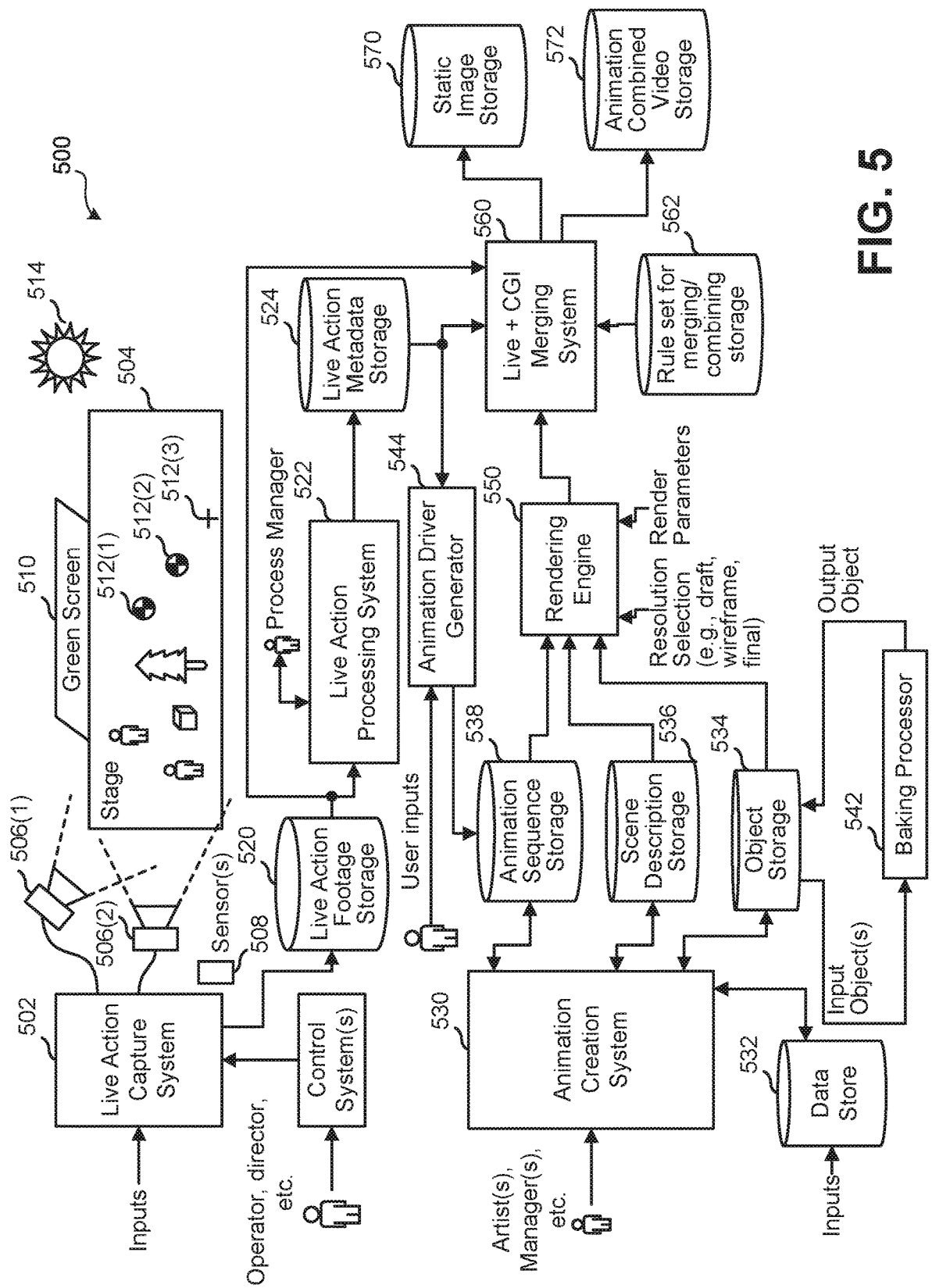
FIG. 5 illustrates an example visual content generation system as might be used to generate imagery in the form of still images and/or video sequences of images.

For example, FIG. 5 illustrates the example visual content generation system 500 as might be used to generate imagery in the form of still images and/or video sequences of images. Visual content generation system 500 might generate imagery of live action scenes, computer generated scenes, or a combination thereof. In a practical system, users are provided with tools that allow them to specify, at high levels and low levels where necessary, what is to go into that imagery. For example, a user might be an animation artist (like artist 122 illustrated in FIG. 1) and might use visual content generation system 500 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 1400 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value is associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 5 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., artist 122 illustrated in FIG. 1) might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 5, a live action capture system 502 captures a live scene that plays out on a stage 504. Live action capture system 502 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 506(1) and 506(2) capture the scene, while in some systems, there might be other sensor(s) 508 that capture information from the live scene (e.g., infrared cameras, infrared sensors, motion capture ("mo-cap") detectors, etc.). On stage 504, there might be human actors, animal actors, inanimate objects, background objects, and possibly an object such as a green screen 510 that is designed to be captured in a live scene recording in such a way that it is easily overlaid with computer-generated imagery. Stage 504 might also contain objects that serve as fiducials, such as fiducials 512(1)-(3), that might be used post-capture to determine where an object was during capture. A live action scene might be illuminated by one or more lights, such as an overhead light 514.

During or following the capture of a live action scene, live action capture system 502 might output live action footage to a live action footage storage 520. A live action processing system 522 might process live action footage to generate data about that live action footage and store that data into a live action metadata storage 524. Live action processing system 522 might include computer processing capabilities, image processing capabilities, one or more processors, program code storage for storing program instructions executable by the one or more processors, as well as user input devices and user output devices, not all of which are shown. Live action processing system 522 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 514, as that might be useful in post-processing to match computer-generated lighting on objects that are computer-generated and overlaid on the live action footage. Live action processing system 522 might operate autonomously, perhaps based on predetermined program instructions, to generate and output the live action metadata upon receiving and inputting the live action footage. The live action footage can be camera-captured data as well as data from other sensors.

An animation creation system 530 is another part of visual content generation system 500. Animation creation system 530 might include computer processing capabilities, image processing capabilities, one or more processors, program code storage for storing program instructions executable by the one or more processors, as well as user input devices and user output devices, not all of which are shown. Animation creation system 530 might be used by animation artists, managers, and others to specify details, perhaps programmatically and/or interactively, of imagery to be generated. From user input and data from a database or other data source, indicated as a data store 532, animation creation system 530 might generate and output data representing objects (e.g., a horse, a human, a ball, a teapot, a cloud, a light source, a texture, etc.) to an object storage 534, generate and output data representing a scene into a scene description storage 536, and/or generate and output data representing animation sequences to an animation sequence storage 538.

Scene data might indicate locations of objects and other visual elements, values of their parameters, lighting, camera location, camera view plane, and other details that a rendering engine 550 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 530 might be interactive, allowing a user to read in animation sequences, scene descriptions, object details, etc. and edit those, possibly returning them to storage to update or replace existing data. As an example, an operator might read in objects from object storage into a baking processor 542 that would transform those objects into simpler forms and return those to object storage 534 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 532 might be used to drive object presentation. For example, if an artist is creating an animation of a spaceship passing over the surface of the Earth, instead of manually drawing or specifying a coastline, the artist might specify that animation creation system 530 is to read data from data store 532 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 544 might read in live action metadata, such as data representing movements and positions of body parts of a live actor during a live action scene. Animation driver generator 544 might generate corresponding animation parameters to be stored in animation sequence storage 538 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 522. Animation driver generator 544 might convert that movement data into specifications of how joints of an articulated CGI character are to move over time.

A rendering engine 550 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 550 might include computer processing capabilities, image processing capabilities, one or more processors, program code storage for storing program instructions executable by the one or more processors, as well as user input devices and user output devices, not all of which are shown.

Visual content generation system 500 can also include a merging system 560 that merges live footage with animated content. The live footage might be obtained and input by reading from live action footage storage 520 to obtain live action footage, by reading from live action metadata storage 524 to obtain details such as presumed segmentation in captured images segmenting objects in a live action scene from their background (perhaps aided by the fact that green screen 510 was part of the live action scene), and by obtaining CGI imagery from rendering engine 550.

A merging system 560 might also read data from rulesets for merging/combining storage 562. A very simple example of a rule in a ruleset might be "obtain a full image including a two-dimensional pixel array from live footage, obtain a full image including a two-dimensional pixel array from rendering engine 550, and output an image where each pixel is a corresponding pixel from rendering engine 550 when the corresponding pixel in the live footage is a specific color of green, otherwise output a pixel value from the corresponding pixel in the live footage."

Merging system 560 might include computer processing capabilities, image processing capabilities, one or more processors, program code storage for storing program instructions executable by the one or more processors, as well as user input devices and user output devices, not all of which are shown. Merging system 560 might operate autonomously, following programming instructions, or might have a user interface or programmatic interface over which an operator can control a merging process. In some embodiments, an operator can specify parameter values to use in a merging process and/or might specify specific tweaks to be made to an output of merging system 560, such as modifying boundaries of segmented objects, inserting blurs to smooth out imperfections, or adding other effects. Based on its inputs, merging system 560 can output an image to be stored in a static image storage 570 and/or a sequence of images in the form of video to be stored in an animated/combined video storage 572.

Thus, as described, visual content generation system 500 can be used to generate video that combines live action with computer-generated animation using various components and tools, some of which are described in more detail herein. While visual content generation system 500 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 6:
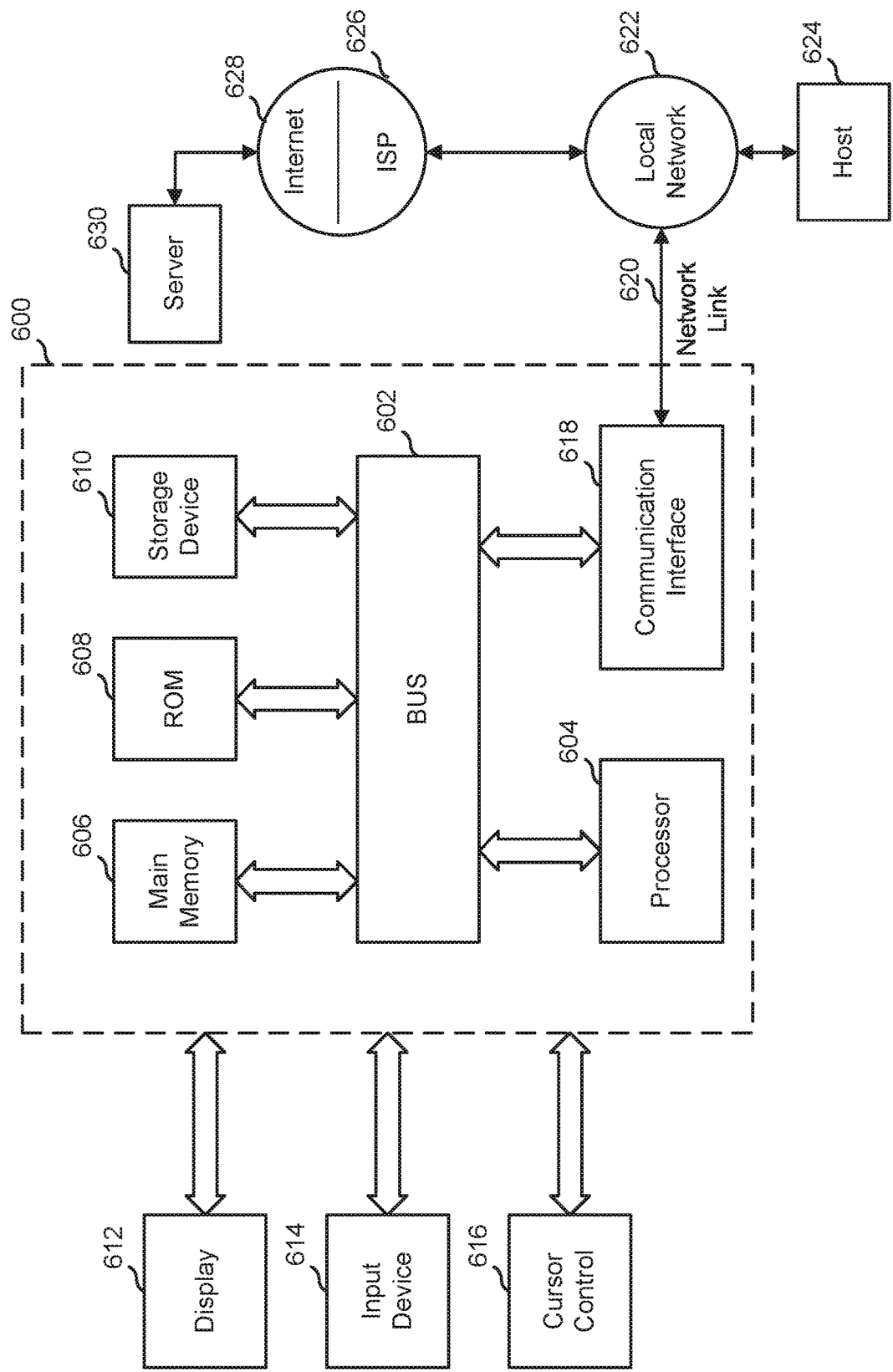
FIG. 6 is a block diagram illustrating an example computer system upon which computer systems of the systems illustrated in FIGS. 1 and 5 may be implemented.

For example, FIG. 6 is a block diagram that illustrates a computer system 600 upon which the computer systems of the systems described herein and/or visual content generation system 500 (see FIG. 5) may be implemented. Computer system 600 includes a bus 602 or other communication mechanism for communicating information, and a processor 604 coupled with bus 602 for processing information. Processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 may also be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a computer monitor, for displaying information to a computer user. An input device 614, including alphanumeric and other keys, is coupled to bus 602 for communicating information and command selections to processor 604. Another type of user input device is a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a network connection. A modem or network interface local to computer system 600 can receive the data. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be a network card, a modem, a cable modem, or a satellite modem to provide a data communication connection to a corresponding type of telephone line or communications line. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620, and communication interface 618. In the Internet example, a server 630 might transmit a requested code for an application program through the Internet 628, ISP 626, local network 622, and communication interface 618. The received code may be executed by processor 604 as it is received, and/or stored in storage device 610, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for generating a facial expression in an animation system, the method comprising:

receiving data associated with a plurality of facial scans of a face of an actor over a plurality of facial expression poses;

obtaining a muscle model comprising a set of facial muscle structural parameters corresponding to a set of facial muscles and a set of numerical strain values corresponding to strains of the set of facial muscles, wherein the set of numerical strain values evolve as the face of the actor changes from a first facial expression pose to a second facial expression pose;

extracting from the plurality of facial scans, a representation of physical deformations of a facial surface of the face;

determining, from the representation of physical deformations of the facial surface and the muscle model, a strain vector representing the strains of the set of facial muscles that cause the physical deformations of the facial surface;

generating, based on the muscle model and the strain vector, a mesh representing the facial surface of the face that is formed into expressions, wherein the mesh is controlled by strain vector values in the strain vector to form the physical deformations of the facial surface; and determining the strain vector values in the strain vector based on current lengths and rest lengths corresponding to the set of facial muscles, that adjust the mesh to form a specific type of physical deformation which causes an animated facial expression on an animated character that corresponds to a plausible facial expression from the actor.

2. The method of claim 1, wherein the plurality of facial scans comprise data pertaining to the physical surface deformations, wherein the deformations are associated with the facial expression poses.

3. The method of claim 1, wherein the set of facial muscle structural parameters in the muscle model comprise a location parameter for a bone attachment point for a facial muscle, a location parameter for a skin attachment point for the facial muscle, and a volume parameter for the facial muscle.

4. The method of claim 1, wherein the set of facial muscle structural parameters in the muscle model further comprises parameters describing a joint.

5. The method of claim 1, wherein determining the control vectors further comprises determining the numerical strain values associated with expansion and contraction of muscles of the set of facial muscles.

6. The method of claim 1 further comprising generating an animated image using a facial expression derived from a blending of strain vector values, and wherein a first numerical strain value of the strain vector values is computed as a difference between a first current length of the first facial muscle and a rest length of the first facial muscle divided by the rest length.

7. The method of claim 1, wherein the muscle model is derived by:

training a machine learning system based on a training dataset of the plurality of facial scans and information relating to the plurality of facial expression poses as ground-truth labels.

8. An animation system comprising:

at least one processor; and medium storing instructions, which when executed by the at least one processor, cause the animation system to:

receive data associated with a plurality of facial scans of a face of an actor over a plurality of facial expression poses;

obtain a muscle model comprising a set of facial muscle structural parameters corresponding to a set of facial muscles and a set of numerical strain values corresponding to strains of the set of facial muscles, wherein the set of numerical strain values evolve as the face of the actor changes from a first facial expression pose to a second facial expression pose;

extract from the plurality of facial scans, a representation of physical deformations of a facial surface of the face;

determine, from the representation of physical deformations of the facial surface and the muscle model, a strain vector representing the strains of the set of facial muscles that cause the physical deformations of the facial surface;

generate, based on the muscle model and the strain vector, a mesh representing the facial surface of the face that is formed into expressions, wherein the mesh is controlled by strain vector values in the strain vector to form the physical deformations of the facial surface; and determine the strain vector values in the strain vector based on current lengths and rest lengths corresponding to the set of facial muscles, that adjust the mesh to form a specific type of physical deformation which causes an animated facial expression on an animated character that corresponds to a plausible facial expression from the actor.

9. The animation system of claim 8, wherein the plurality of facial scans comprise data pertaining to the physical surface deformations, wherein the deformations are associated with the facial expression poses.

10. The animation system of claim 8, wherein the set of facial muscle structural parameters in the muscle model comprise a location parameter for a bone attachment point for a facial muscle, a location parameter for a skin attachment point for the facial muscle, and a volume parameter for the facial muscle.

11. The animation system of claim 8, wherein the set of facial muscle structural parameters in the muscle model further comprises parameters describing a joint.

12. The animation system of claim 8, the control vectors are the numerical strain values associated with expansion and contraction of muscles of the set of facial muscles.

13. The animation system of claim 8, wherein an animated image is generated using a facial expression derived from a blending of strain vector values, and wherein a first numerical strain value of the strain vector values is computed as a difference between a first current length of the first facial muscle and a rest length of the first facial muscle divided by the rest length.

14. A non-transitory computer-readable storage medium storing instructions, which when executed by at least one processor of a computer system, causes the computer system to:

receive data associated with a plurality of facial scans of a face of an actor over a plurality of facial expression poses;

obtain a muscle model comprising a set of facial muscle structural parameters corresponding to a set of facial muscles and a set of numerical strain values corresponding to strains of the set of facial muscles, wherein the set of numerical strain values evolve as the face of the actor changes from a first facial expression pose to a second facial expression pose;

extract from the plurality of facial scans, a representation of physical deformations of a facial surface of the face;

determine, from the representation of physical deformations of the facial surface and the muscle model, a strain vector representing the strains of the set of facial muscles that cause the physical deformations of the facial surface;

generate, based on the muscle model and the strain vector, a mesh representing the facial surface of the face that is formed into expressions, wherein the mesh is controlled by strain vector values in the strain vector to form the physical deformations of the facial surface; and determine the strain vector values in the strain vector based on current lengths and rest lengths corresponding to the set of facial muscles, that adjust the mesh to form a specific type of physical deformation which causes an animated facial expression on an animated character that corresponds to a plausible facial expression from the actor.

15. The non-transitory computer-readable storage medium of claim 14, further storing instructions, which when executed by at least one processor of a computer system, causes the computer system to process the plurality of facial scans as data pertaining to the physical surface deformations, wherein the deformations are associated with the facial expression poses.

16. The non-transitory computer-readable storage medium of claim 14, further storing instructions, which when executed by at least one processor of a computer system, causes the computer system to process the plurality of facial scans based on an anatomical model that corresponds to human anatomy.

17. The non-transitory computer-readable storage medium of claim 16, further storing instructions, which when executed by at least one processor of a computer system, causes the computer system to process the animated facial expression using an alternative anatomical model that is distinct from an anatomy of the actor.

18. The non-transitory computer-readable storage medium of claim 16, further storing instructions, which when executed by at least one processor of a computer system, causes the computer system to process the control vectors by determining the numerical strain values associated with expansion and contraction of muscles of the set of facial muscles.

19. The non-transitory computer-readable storage medium of claim 16, further storing instructions, which when executed by at least one processor of a computer system, causes the computer system to process a facial expression derived from a blending of strain vector values, and wherein a first numerical strain value of the strain vector values is computed as a difference between a first current length of the first facial muscle and a rest length of the first facial muscle divided by the rest length.

20. The non-transitory computer-readable storage medium of claim 14, wherein the muscle model is derived by:

training a machine learning system based on a training dataset of the plurality of facial scans and information relating to the plurality of facial expression poses as ground-truth labels.

* * * * *